Patented July 25, 1939

2,166,934

UNITED STATES PATENT OFFICE 2,166,934

PHTHALIC ACID ESTERS

John B. Tuttle, Elizabeth, N. J., assignor to Standard Oil Development Company, a corporation of Delaware No Drawing. Application May 2, 1935,
Serial No. 19,507

1 Claim. (Cl. 260—475)

This invention relates to novel plasticizers and methods of preparing same. These plasticizers are intended particularly for use with pyroxylin, enamels and lacquers, although it is not intended that the invention be limited specifically to these particular uses.

Broadly, the invention comprises preparing plasticizers by esterification of high molecular weight alcohols obtained by the oxidation of substantially solid petroleum hydrocarbons, especially paraffin wax.

In order to prepare the high molecular weight alcohols, a suitable starting material such as paraffin wax, petrolatum or other mineral hydrocarbon of a waxy nature, is oxidized at 140° to 200° C. with a small amount of oxidation catalyst by blowing with air for a period ranging from one-half to six hours or so, depending upon the reaction conditions, the longer time being required at the lower temperature. Various catalysts, such as manganese soaps of fatty acids, may be used, particularly the higher fatty acids and the manganese soaps of acids produced by the oxidation of paraffin wax. Other oxidation catalysts include oxides, soaps, or other compounds of other heavy metals, such as lead, cobalt, etc.

Although it is possible to use the crude oxidation products directly as the material to be esterified, it is preferable to separate any unoxidized wax from the oxygenated products by extraction with a suitable solvent or by any other suitable means, and it is still further preferable to subject this extract, which may contain from 30 to 60% or so of alcohols, as such or after the organic acids have been neutralized with caustic soda, to hydrogenation under conditions adapted to convert most of the aldehydes, ketones, and possibly some of the acids present into primary and secondary alcohols respectively without causing appreciable conversion of the alcohols already present to hydrocarbons. This hydrogenation may be carried out, for instance, at 150° to 200° C. and a pressure of 50 to 300 atmospheres, with a suitable hydrogenation catalyst, such as nickel, for a length of time ranging between the approximate limits of one-half hour to five hours depending upon the severity of the hydrogenation conditions. The resulting hydrogenated product may be used as such or after still further refining, such as by fractional distillation or precipitation or extraction with suitable solvents to remove impurities or to remove any undesired fraction or to obtain any particular desired fraction, or after neutralization of organic acids with caustic soda.

The finished product consists chiefly of a mixture of aliphatic alcohols having more than 10 carbon atoms, some having as high as 25 or more, but usually averaging about 16 to 18 carbon atoms.

Many different acids can be used for the esterification, the following being typical examples:

| Type | Name | Formula |
|---|---|---|
| Inorganic | Boric | $H_3BO_4$. |
|  | Phosphoric | $H_3PO_4$. |
|  | Carbonic | $H_2CO_3$. |
| Organic: |  |  |
| Aliphatic—monobasic | Acetic | $CH_3COOH$. |
|  | Butyric | $C_3H_7COOH$. |
|  | Stearic | $C_{17}H_{35}COOH$. |
|  | Lactic | $CH_3CH(OH)COOH$. |
|  | Gluconic | $C_5H_6(OH)_5COOH$. |
| dibasic (sat.) | Succinic | $C_2H_4(COOH)_2$. |
|  | Malic | $C_2H_3(OH)(COOH)_2$. |
|  | Tartaric | $C_2H_2(OH)_2(COOH)_2$. |
|  | Adipic | $C_4H_8(COOH)_2$. |
| (unsat.) | Fumaric | $C_2H_2(COOH)_2$ (trans.) |
|  | Maleic | $C_2H_2(COOH)_2$ (cis.). |
| tribasic | Citric | $C_3H_4(OH)(COOH)_3$. |
| Aromatic | Abietic | $C_{19}H_{29}COOH$. |
|  | Phthalic | $C_6H_4(COOH)_2$. |

One may also use acids from oxidized wax, acids from oxidized oils, rosin, turpentine, etc., as well as acids such as condensation products of maleic acid and diolefins.

It is of course understood that the above acids are only given for the sake of illustration and the invention is not intended to be limited thereto. It should be pointed out, however, that the dibasic aliphatic and aromatic acids are particularly suitable for carrying out the invention.

The esterification of the high molecular weight alcohols, produced as described above, may be carried out by any suitable means, for instance, by heating to about 50° to 200° C. the high molecular weight alcohols and the desired acid (or mixture of acids) in approximately molar proportions so as to obtain approximately a neutral product. Suitable esterification promoters or catalysts may be used such as a small amount of sulfuric acid or dry hydrogen chloride gas, boron fluoride, etc. The finished ester may be subjected to further refinement, if desired, by washing with water or with dilute solutions of acids or bases or clay treating, heat treating or by air blowing.

Although these ester products may find various industrial uses, depending upon how they were prepared, yet they have been found particularly suitable for use as plasticizers for pyroxylin, enamels, lacquers, etc. including films such as regenerated cellulose and cellulose acetate (used extensively in "safety glass"). For such use, the crude or refined ester product may be used as such or after fractionation, by distillation (preferably in vacuo), precipitation, etc., to a particular boiling range, e. g. between the approximate limits of 200 and 450° C. For these purposes a series of esters of a homologous series is much better than a pure ester from the point of view of evaporation, activity, action on film, blushing, etc. They also have the additional important advantage of lower cost compared to single pure compounds capable of use for similar purposes.

In using the plasticizers prepared according to the present invention, the desired pyroxylin, lacquer, or other stock to be plasticized is compounded with a mixture of the plasticizer and a suitable solvent, such as solvents obtained by the oxidation or hydrogenation (solvesso) of liquid petroleum fractions, various esters of acetic acid, diethyl carbonate, benzol, toluol, solvent naphtha, etc., with or without pigments or dyes, oxidation inhibitors, and other addition agents known to the art.

For the sake of illustration only and without intention of limiting the invention thereto, the following specific example is given:

Refined paraffin wax is oxidized in the presence of 0.1% of soda ash at a temperature of 160° C. by air blowing for 4 hours (at 180° C. 2 hours would be sufficient). The crude oxidation product is found to have the following approximate composition:

|   | Per cent |
|---|---|
| Unoxidized wax | 20 |
| Alcohols averaging 14 to 16 carbon atoms | 40 |
| Aldehydes and ketones | 40 |
|   | 100 |

This crude oxidation product is extracted with 95% methanol at 50° to 60° C. in order to separate the unoxidized from the oxidized products. The extract is then hydrogenated at 180° C. under a pressure of 100 to 200 atmospheres, using a nickel-kieselguhr catalyst for 1 to 3 hours. The product is found to comprise about 80 to 95% of alcohols and 5 to 20% of carbonyl compounds (aldehydes and ketones). About 400 parts of this hydrogenated product consisting largely of high molecular weight aliphatic alcohols are then reacted with about 150 parts of phthalic anhydride at a temperature of about 150° C. until reaction is substantially complete.

The resultant ester product is neutralized and fractionated to a boiling range of about 250° to 300° C. One part of this plasticizer is then mixed with 3 parts of ethyl acetate and 1 part of pyroxylin. The amount of plasticizer to be used will vary, as is known to those skilled in the art, according to the intended use as well as the boiling point and viscosity of the plasticizer and the amount, kind, and proportions of the solvent and the coating material to be plasticized.

The invention is not to be limited to the specific embodiments shown nor the specific examples given, but in the appended claim it is intended to claim all inherent novelty in the invention as broadly as the prior art permits.

I claim:

Method of preparing ester products adapted to be used as plasticizers for pyroxylin, enamels, lacquers and the like, which comprises oxidizing paraffin wax with air at about 140–200° C. for about ½ to 6 hours in the presence of an oxidation catalyst, separating the oxidized products from the unoxidized hydrocarbons, subjecting the oxidized products to hydrogenation at about 150–200° C. and about 50–300 atmospheres for ½ to 5 hours in the presence of a hydrogenation catalyst, esterifying the resulting product consisting largely of high molecular weight aliphatic alcohols with a dibasic acid selected from the group consisting of phthalic acid and anhydride and separating from the resulting esterified product a fraction having a boiling range of about 250–300° C.

JOHN B. TUTTLE.